US012509118B2

(12) United States Patent
Gyllenhammar et al.

(10) Patent No.: US 12,509,118 B2
(45) Date of Patent: Dec. 30, 2025

(54) SAFETY AND/OR PERFORMANCE MONITORING OF AN AUTOMATED DRIVING SYSTEM

(71) Applicant: ZENSEACT AB, Gothenburg (SE)

(72) Inventors: Magnus Gyllenhammar, Pixbo (SE); Daniel Åsljung, Gothenburg (SE)

(73) Assignee: ZENSEACT AB, Gothenburg (SE)

( * ) Notice: Subject to any disclaimer, the term of this patent is extended or adjusted under 35 U.S.C. 154(b) by 313 days.

(21) Appl. No.: 18/181,913

(22) Filed: Mar. 10, 2023

(65) Prior Publication Data

US 2023/0286543 A1 Sep. 14, 2023

(30) Foreign Application Priority Data

Mar. 14, 2022 (EP) .................................... 22161960

(51) Int. Cl.
*B60W 50/00* (2006.01)
*B60W 50/04* (2006.01)
(Continued)

(52) U.S. Cl.
CPC ...... *B60W 60/0018* (2020.02); *B60W 50/045* (2013.01); *G06F 8/65* (2013.01); *G07C 5/008* (2013.01); *B60W 2556/45* (2020.02)

(58) Field of Classification Search
None
See application file for complete search history.

(56) References Cited

U.S. PATENT DOCUMENTS

| 2019/0102689 A1* | 4/2019 | Lassoued | G07C 5/085 |
| 2021/0118245 A1* | 4/2021 | Gyllenhammar | G01S 17/86 |

(Continued)

FOREIGN PATENT DOCUMENTS

| EP | 3812954 A1 | 4/2021 |
| EP | 3906541 A1 | 11/2021 |

OTHER PUBLICATIONS

Wood, Matthew et al.; "Safety First for Automated Driving"; Jul. 13, 2019; Retrieved from the Internet—https://www.connectedautomateddriving.eu/wp-content/uploads/2019/09/Safety_First for Automated Driving.pdf; pp. 72-98.

(Continued)

*Primary Examiner* — James M McPherson
(74) *Attorney, Agent, or Firm* — Sage Patent Group (57) ABSTRACT

The present invention relates to methods and systems for safety and/or performance monitoring of an Automated Driving System (ADS). The method comprises obtaining a plurality of Performance Indicators (PIs) generated by each of a plurality of ADS-equipped vehicles based one or more driving sessions, wherein the plurality of PIs are of at least one PI-type. The method further comprises modelling each PI-type of the obtained PIs based on an Extreme Value Theory (EVT) model, wherein each modelled PI-type is indicative of a probability for exceeding a PI-value for that PI-type, and evaluating each modelled PI-type against a corresponding predefined requirement. Then, if the evaluation fails, determining that the ADS has violated one or more safety or quality requirements, and transmitting a first signal indicative of the violated one or more safety or quality requirements to an ADS management system and/or a second signal to the plurality of ADS-equipped vehicles.

15 Claims, 4 Drawing Sheets

(51) Int. Cl.
  *B60W 60/00* (2020.01)
  *G06F 8/65* (2018.01)
  *G07C 5/00* (2006.01)

(56) References Cited

U.S. PATENT DOCUMENTS

| | | | |
|---|---|---|---|
| 2021/0323577 A1 | 10/2021 | Gyllenhammar et al. | |
| 2021/0325901 A1 | 10/2021 | Gyllenhammar et al. | |
| 2022/0324467 A1* | 10/2022 | Alvarez | G08G 1/096725 |
| 2023/0141561 A1* | 5/2023 | Hagvall | G06F 17/18 701/23 |

OTHER PUBLICATIONS

Åsljung, Daniel et al.; "Validation of Collision Frequency Estimation Using Extreme Value Theory"; 2017 IEEE 20th International Conference on Intelligent Transportation Systems (ITSC); Oct. 16, 2017 6 pages.

Orsini, Federico et al; "Large-scale road safety evaluation using extreme value theory"; IET Intelligent Transport Systems, The Institution of Engineering and Technology, vol. 14, No. 9; Sep. 1, 2020; pp. 1004-1012 (14 pages).

Riedmaier, Stefan et al.; "Non-deterministic Model Validation Methodology for Simulation-based Safety Assessment of Automated Vehicles"; Simulation Modelling Practice and Theory; Nov. 6, 2020; 22 pages.

Åsljung, Daniel; "On Safety Validation of Automated Driving Systems using Extreme Value Theory"; Thesis for the Degree of Licentiate of Engineering, Department of Electrical Engineering, Chalmers University of Technology; Göteborg, Sweden; 2017; 111 pages.

Åsljung, Daniel et al.; "Using Extreme Value Theory for Vehicle Level Safety Validation and Implications for Autonomous Vehicles"; IEEE Transactions on Intelligent Vehicles, vol. 2, No. 4; Dec. 2017; 10 pages.

Extended European Search Report mailed Nov. 10, 2022 for European Application No. 22161960.4, 14 pages.

Partial European Search Report mailed Aug. 24, 2022 for European Application No. 22161960.4, 13 pages.

* cited by examiner

SAFETY AND/OR PERFORMANCE MONITORING OF AN AUTOMATED DRIVING SYSTEM

CROSS-REFERENCE TO RELATED APPLICATIONS

The present application for patent claims priority to European Patent Office Application Ser. No. 22161960.4, entitled "SAFETY AND/OR PERFORMANCE MONITORING OF AN AUTOMATED DRIVING SYSTEM" filed on Mar. 14, 2022, assigned to the assignee thereof, and expressly incorporated herein by reference.

TECHNICAL FIELD

The present invention relates to methods and systems for safety and/or performance monitoring of an Automated Driving System (ADS).

BACKGROUND

During the last few years, the research and development activities related to autonomous vehicles have exploded in number and many different approaches are being explored. An increasing portion of modern vehicles have advanced driver-assistance systems (ADAS) to increase vehicle safety and more generally road safety. ADAS—which for instance may be represented by adaptive cruise control, ACC, collision avoidance system, forward collision warning, etc.—are electronic systems that may aid a vehicle driver while driving. Today, there is ongoing research and development within a number of technical areas associated to both the ADAS and Autonomous Driving (AD) field. ADAS and AD will herein be referred to under the common term Automated Driving System (ADS) corresponding to all of the different levels of automation as for example defined by the SAE J3016 levels (0-5) of driving automation, and in particular for level 4 and 5.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles, free-space areas, and/or relevant signage.

ADS features as described above are, however, bound to be required to function with a high integrity to provide sufficiently low risk for the vehicle occupant(s) as well as their surrounding environments. Ensuring that the risk is sufficiently low may require intractable amounts of data for statistical proofs, and would, according to an example, take e.g. approximately a hundred vehicles to drive continuously for five centuries, to acquire. There are several approaches to minimize the risk of the ADS features before they are launched onto public roads. However, on top of this, it is generally believed that the ADS features should be monitored once in the field, in order to ensure that they adhere to required safety levels. Further, as the complete sensor setups utilized by various ADS features may generate huge amounts of data, it may be challenging, if not impossible, to send all of that data to a cloud for offline processing and analysis.

Technically it is possible to share all of the data a vehicle sensed when on a drive with the monitoring entity, but the reality is that the sensor setups of each vehicle will generate data streams comprising huge amounts of data as the vehicle is being driven around. If all of the sensed data which an ADS on-board a vehicle utilizes when the vehicle is being driven was sent to a remote server for offline processing and analysis, the large amounts of data to be transferred could mean that, even over a very high bandwidth connection, the duration of each data transfers could be impractical. Moreover, the high bandwidth, good quality connections and the long duration of the data transfers would use up communication resources as well as power resources on each vehicle and/or the monitoring entity whenever a data transfer was attempted. For a monitoring entity such as a back-office server monitoring and managing a vehicle fleet ADS where the fleet comprises a large number of vehicles, additional complications such as congestion could arise if a large number of vehicles in the fleet transferred all the data used to configure their individual on-board ADSs to the back-office server at the same time.

There is accordingly a need in the art for new solutions for assuring the operational capability of the ADSs, both from a safety perspective and a performance (quality) perspective. A goal for such assurance methods is to minimize the residual risk at deployment such that it is acceptable in relation to posed safety and performance requirements.

SUMMARY

It is therefore an object of the present invention to provide a computer-implemented method for safety and/or performance monitoring of an Automated Driving System (ADS), a computer-readable storage medium, a corresponding processing system, a remote server, and a cloud environment, which alleviate all or at least some of the above-discussed drawbacks of presently known systems and methods.

This object is achieved by means of a computer-implemented method for safety and/or performance monitoring of an Automated Driving System (ADS), a computer-readable storage medium, a corresponding processing system, a remote server, and a cloud environment as defined in the appended independent claims. The term exemplary is in the present context to be understood as serving as an instance, example or illustration.

According to a first aspect of the present invention, there is provided a computer-implemented method for safety and/or performance monitoring of an Automated Driving System (ADS). The method comprises obtaining a plurality of Performance Indicators (PIs) generated by each of a plurality of ADS-equipped vehicles based one or more driving sessions, wherein the plurality of PIs are of at least one PI-type and wherein each PI-type is indicative of a safety-critical or quality-critical incident that the ADS-equipped vehicles have been exposed to during the one or more driving sessions. The method further comprises modelling each PI-type of the obtained PIs based on an Extreme Value Theory (EVT) model, wherein each modelled PI-type is indicative of a probability for exceeding a PI-value for that PI-type, and evaluating each modelled PI-type against a corresponding predefined requirement. Then, if the evaluation is indicative of one or more modelled PI-types failing the corresponding predefined requirements, the method further comprises determining that the ADS has violated one or more safety or quality requirements, and transmitting a first signal indicative of the violated one or more safety or quality requirements to an ADS management system and/or a second signal to the plurality of ADS-equipped vehicles.

According to a second aspect of the present invention, there is provided a (non-transitory) computer-readable storage medium storing one or more programs configured to be executed by one or more processors of a processing system, the one or more programs comprising instructions for performing the method according to any one of the embodiments disclosed herein. With this aspect of the invention, similar advantages and preferred features are present as in the previously discussed first aspect of the invention.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a third aspect of the present invention, there is provided a processing system for safety and/or performance monitoring of an Automated Driving System (ADS). The processing system comprises control circuitry configured to obtain a plurality of Performance Indicators (PIs) generated by each of a plurality of ADS-equipped vehicles based one or more driving sessions, where the plurality of PIs are of at least one PI-type and wherein each PI-type is indicative of a safety-critical or quality-critical incident that the ADS-equipped vehicles have been exposed to during the one or more driving sessions. The control circuitry is further configured to model each PI-type of the obtained PIs based on an Extreme Value Theory (EVT) model, where each modelled PI-type is indicative of a probability for exceeding a PI-value for that PI-type, and to evaluate each modelled PI-type against a corresponding predefined requirement. Then, if the evaluation is indicative of one or more modelled PI-types failing the corresponding predefined requirements, the control circuitry is further configured to determine that the ADS has violated one or more safety or quality requirements if the evaluation is indicative of one or more modelled PI-types failing the corresponding predefined requirements, and to transmit a first signal indicative of the violated one or more safety or quality requirements to an ADS management system and/or a second signal to the plurality of ADS-equipped vehicles. With this aspect of the invention, similar advantages and preferred features are present as in the previously discussed first aspect of the invention.

According to a fourth aspect of the present invention, there is provided a remote server comprising the processing system according to any one of the embodiments disclosed herein.

According to a fifth aspect, there is provided a cloud environment comprising one or more remote servers according to any one of the embodiments disclosed herein.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF THE DRAWINGS

Further objects, features and advantages of embodiments of the invention will appear from the following detailed description, reference being made to the accompanying drawings, in which.

DETAILED DESCRIPTION

In the following detailed description, embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs), Field Programmable Gate Arrays (FPGA) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

As mentioned in the foregoing, one of the challenges in bringing Automated Driving Systems (ADSs) to the market is to ensure their safety on the public roads. This is especially difficult due to the high integrity requirements imposed on the ADS for it to perform on par with, or better than, human drivers. It is commonly agreed that brute force approaches to validation of the system is not feasible (requiring billions of kilometers of testing to achieve). Alternative methods generally leave some residual risk at deployment due to numerous uncertainties across the development and assurance cycle of the product. The goal for assurance is to minimize the residual risk at deployment such that it is acceptable in relation to the predefined safety and performance requirements. Further, there is industry consensus of the need for monitoring of the ADSs once released on the road.

Some embodiments presented herein may be used to supplement current approaches in minimizing and addressing the residual risks (i.e. remaining risk after the ADS has been deployed in a fleet of vehicles) by effectively providing a predictive monitoring solution for the fleet of vehicles after deployment.

In more detail, some embodiments presented herein leverage continuous measurements from each individual ADS-equipped vehicle to build a statistical model of the ADS's distance between failures by utilizing Extreme Value Theory (EVT) on a set of safety/key performance indicators, herein referred to simply as "performance indicators" (PIs). An advantage of using EVT instead of other conventional statistical models is that the EVT is, in general, a more accurate approach for modelling the heavy tails resulting from the measurements.

A performance indicator (PI) may be understood as a metric acting as a proxy for estimating the safety and/or performance of the ADS, where performance is in reference to "quality" performance. An advantage of using a proxy for estimating the safety and/or performance of the ADS instead of monitoring the incident frequencies (e.g. accident frequencies) directly across the fleet of ADS-equipped vehicles is that one can make accurate estimations of the safety and/or performance of the ADS without actually requiring incidents to occur, which is troublesome when considering fatal accidents.

The term "performance indicator" as used herein may in some embodiments be understood as "threat measure". More specifically, a performance indicator may be a parameter of a specific performance indicator type (PI-type). The PI-type may in accordance with some embodiments be Brake Threat Number (BTN), Steering Threat Number (STN), Time to Collision (TTC), and/or Post Encroachment Time (PET), Time to Brake (TTB), distance to road reference, and/or distance to external object. This list is not exhaustive, and the person skilled in the art readily realizes that other performance indicators indicative of a threat measure for an ADS-equipped vehicle may be employed such as Deceleration Time (DT), Time Headway (THW), Lateral/Longitudinal Jerk, or various derivatives of any one the aforementioned performance indicators.

The resulting effects/advantages are twofold. Firstly, it effectively helps reducing the residual risks of the deployed system by monitoring the safety and/or performance and optionally deactivating the ADS (or a specific module/feature thereof) if it is found to violate its requirements, thus increasing the expected safety of the system. As an alternative or addition, a software roll-back may be performed across the fleet if a currently deployed software version of the ADS is found to violate its requirements. Secondly, it helps to relieve some of the burden of minimizing the residual risk before deployment (as it is monitored, and operations can be paused/aborted before excessive risks are incurred) and thus reduce the time-to-market of the ADS (or updates thereof).

Accordingly, the embodiments presented herein utilize EVT to make statistical models of a PI, which in turn allows for predictive statements about the ADS's safety/performance during operations. It should be noted that a PI may either be safety or quality related, meaning that it is indicative of the safety level of the ADS or the quality level of the ADS. The latter being for example in terms of comfort for the occupants of the ADS-equipped vehicle (e.g. avoiding uncomfortable maneuvers/acceleration).

Extreme Value Theory (EVT) is an area of statistics that focuses on the rare events instead of the common events. It was first applied in the area of civil engineering to better understand the requirements for what structures need to be able to handle over a long period of time. It provided a framework to describe the magnitude of forces that could be expected based on historical data. The framework of EVT contains a set of models that enable the usage of observed levels of data and extrapolate that into estimates of unobserved levels.

An example of how EVT is being used today is the design of coastal defense barriers. Here, one may have data on the sea level at the specific location for the last 10 years, but the barriers should be able to protect against high sea levels for maybe the next 100 years. EVT can then be used to model the observed sea levels from the last 10 years in order to estimate the highest expected sea level during the expected lifetime of the barrier. There are two main approaches for practical extreme value analysis, Block Maxima and Peak over Threshold (POT).

The statistical behavior that is modelled in the Block Maxima approach is the maximum ($M_n$) of a sequence of independent random variables, where $M_n = \max\{X_1, \ldots, X_n\}$. The measurements $X_1, \ldots, X_n$ could, in reference to the seal-level example, be daily measurements of sea-level. The value $M_n$ is accordingly the maximum of these measurements during a certain time, e.g. one year, one month, one week, etc. In other words, one groups the measurements in separate blocks and extract the maximum value in each block. Then, if the cumulative distribution F of the max value is known, this could be used to estimate the frequency of more rare events. In practice, the distribution F is unknown but can be approximated to a set of models based only on the extreme data. The set of models can be represented by the Generalized Extreme Value (GEV) distribution. The distribution consist of three parameters location ($\mu$), shape ($\xi$) and scale ($\sigma$) with the following probability density function:

$$f(x|\xi, \sigma, \mu) = \frac{1}{\sigma}\exp\left(-\left(1+\xi\frac{x-\mu}{\sigma}\right)^{-\frac{1}{\xi}}\right)\left(1+\xi\frac{x-\mu}{\sigma}\right)^{-1-\frac{1}{\xi}} \quad (1)$$

If data is collected over multiple blocks (e.g. several years), a series of block maxima $M_{n,1}, \ldots, M_{n,m}$, can be used to fit a GEV distribution. Then the probability that a yearly maximum is exceeding some value $x_p$ can be derived using the inverse cumulative distribution function:

$$p = 1 - F(x_p) \quad (2)$$

The second approach (i.e. POT) avoids the blocking and instead one only models the most extreme events that exceed some threshold (u). The values that exceed the threshold are called exceedances. These values then belong to a distribution family called the Generalized Pareto (GP) Distribution. The GP distribution consists of similar parameters as the GEV distribution, with shape (ξ) and scale (σ), and threshold (u). It has the following probability density function:

$$f(x|\xi, \sigma, u) = \frac{1}{\sigma}\left(1 + \xi\frac{x-u}{\sigma}\right)^{-\left(\frac{1}{\xi}+1\right)} \quad (3)$$

To avoid bias or high variance of the estimation, the threshold may be chosen as low as possible while still having a good fit to the model. The probability that a specific value is exceeded can be derived similarly to the block maxima method. Suppose that $\zeta_u=\Pr\{X>u\}$, then the probability (p) that the value $x_p$ is exceeded is:

$$p=\zeta_u(1-F(x_p)) \quad (4)$$

The probability (p) that is received for a certain value $x_p$ can be used to find the average time between measurements that exceed this value. In EVT this time is referred to as the return period, and the corresponding value (e.g. seal-level in the above example) is called the return level. Given a probability, the return period, $t_p$, can be derived using the following formula:

$$t_p = \frac{t_{tot}}{np} \quad (5)$$

where $t_{tot}$ is the total time of data gathering and n is the number of blocks for the Block Maxima method or the total number of measurements for the POT method. If one is interested in how often a certain value is exceeded, the answer would be the corresponding return period. Reverting to the previously used example, this could for example be of interest to evaluate the effectiveness of a certain height for a seawall as the return period would then correspond to an estimate of how often the barrier would be flooded. Additionally, one may assign a confidence interval to the estimate by using the profile likelihood method. This means that the log-likelihood value for the parameters is allowed to have a deviation from the maximum likelihood based on the chi-squared distribution:

$$\log \mathcal{L}_\alpha = \log \mathcal{L}(\hat{\xi},\hat{\sigma}) - \chi_{1-\alpha,1}^2$$

where α signifies the required risk level of the corresponding confidence interval of $100(1-\alpha)\%$. This likelihood limit can then be used to create a confidence interval of the return period, $t_p$, by finding the minimum and maximum values, which likelihood of the parameters lies above this limit.

$$[\min(t_p|\mathcal{L}(\xi,\sigma)>\mathcal{L}_\alpha), \max(t_p|\mathcal{L}(\xi,\sigma)>\mathcal{L}_\alpha)]$$

Accordingly, in some embodiments, the predictive estimates of the ADS's safety and/or performance are created by extrapolating the EVT models beyond the "observed" data. In more detail, the solution proposed herein makes use of such EVT models of a PI in order to estimate the potential (unwanted) risk of the ADS being in violation with one of the its predefined safety and/or quality requirements.

In short, some embodiments of the present invention propose a system where a plurality of ADS-equipped vehicles in a fleet are configured to measure and derive the desired PI during operations. All of the PI values (or some filtered subset thereof, such as e.g. the worst e.g. 10 values from the drive) are transmitted to the "back-office" where the values are stored in a database 30. These PI values are then used together to create the EVT model. The created model is subsequently compared to a set of predefined performance/safety requirements of the ADS and if it is found that EVT model indicates that a requirement is violated, this is evidence for rejecting the null hypothesis. Here, the null hypothesis may be formulated as that ADS's performance is in compliance with the performance/safety requirements of the ADS. The consequence of the rejection is that a roll-back to previous ("safe") software (SW) version should be initiated, or if no such previous SW exist, operations with that ADS SW version should be inhibited until a software update can be performed.

Figure 1:
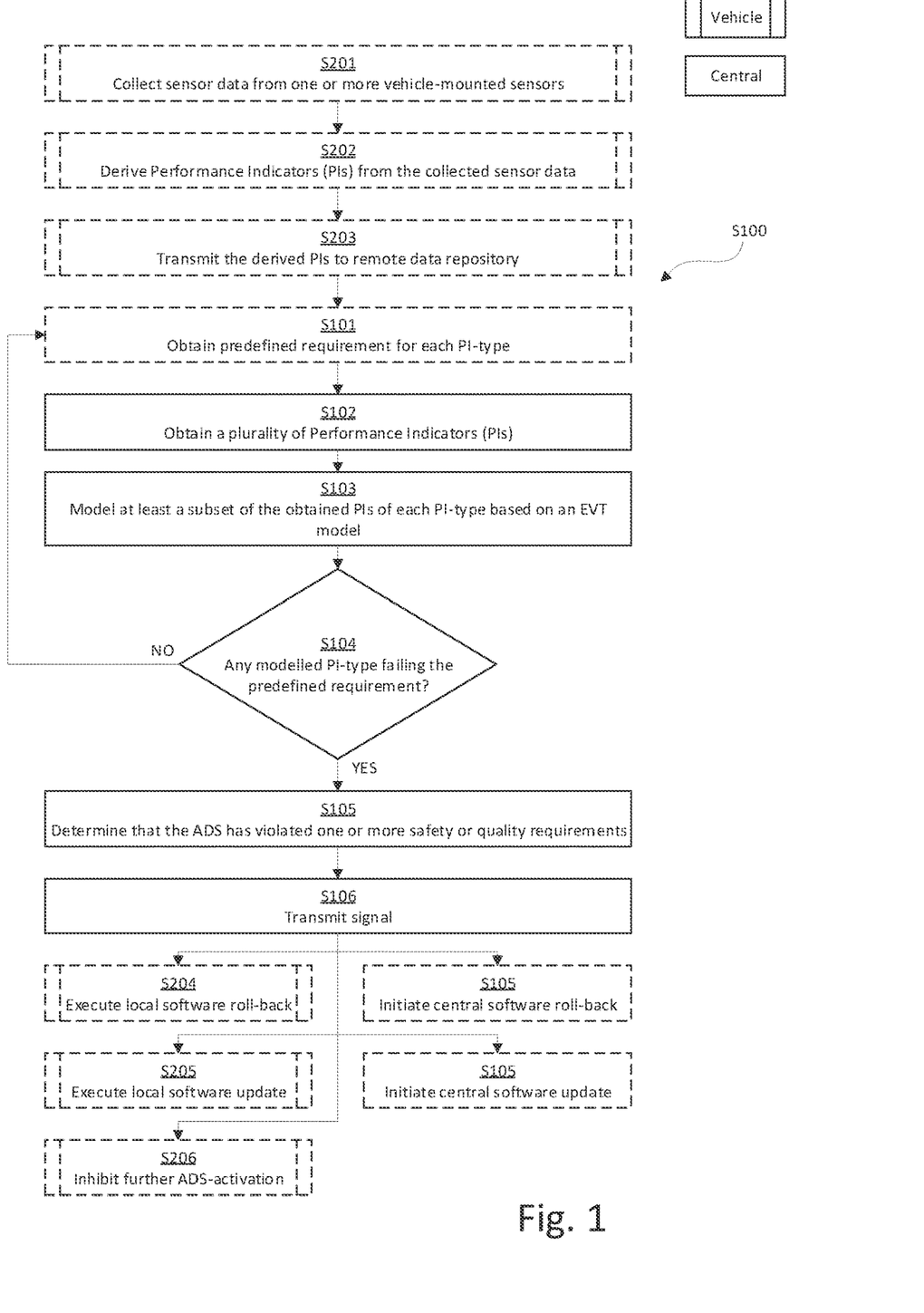
FIG. 1 is a schematic flowchart representation of a method for safety and/or performance monitoring of an Automated Driving System (ADS) in accordance with some embodiments.

Further, FIG. 1 is a schematic flowchart representation of a computer-implemented method S100 for safety and/or performance monitoring of an ADS. Here, performance monitoring may be construed as performance in terms of "quality", i.e. in accordance with a quality specification, which may include requirements related to lateral/longitudinal jerk, damage to the vehicle body, proximity to Vulnerable Road Users, etc. Moreover, it should be noted that some of the steps of the method S100 are preferably performed by the ADS-equipped vehicles, while other steps are preferably performed by a "central entity" (may also be referred to as back-office, fleet management system, etc.) as indicated by the different box-types in the flowchart in accordance with the indication in the top-right corner of FIG. 1.

The method S100 comprises obtaining S102 a plurality of performance indicators (PIs) generated by each of a plurality of ADS-equipped vehicles based one or more driving sessions. The plurality of PIs are of at least one PI-type and each PI-type is indicative of a safety-critical or quality-critical incident that the ADS-equipped vehicles have been exposed to during the one or more driving sessions. In other words, a set of PI-values related to one or more PI-types (e.g. BTN, TTC, PET, etc.) are received from a plurality of ADS-equipped vehicles. In some embodiments, the step of obtaining S102 the plurality of PIs comprises obtaining PI values (e.g. numerical values) of at least one PI-type. The term obtaining is herein to be interpreted broadly and encompasses receiving, retrieving, collecting, acquiring, and so forth. Further, the obtained S102 plurality of PIs (or PI values) may be stored (and catalogued) in a suitable database.

Accordingly, each ADS-equipped vehicle of the plurality of ADS-equipped vehicles is configured to collect S201 sensor data from one or more vehicle-mounted sensors. The ADS-equipped vehicles referred to herein preferably comprise a perception system (may also be referred to as perception module or perception block) and a localization system. A perception system is in the present context to be understood as a system responsible for acquiring raw sensor data from on-board sensors (vehicle-mounted sensors) such as cameras, LIDARs and RADARs, ultrasonic sensors, and converting this raw data into scene understanding. The localization system is configured to monitor a geographical position and heading of the vehicle, and may in the form of a Global Navigation Satellite System (GNSS), such as a GPS (or any other regional variant thereof). However, the localization system may alternatively be realized as a Real Time Kinematics (RTK) GPS in order to improve accuracy.

The ADS-equipped vehicles are further configured to derive S202 performance indicators (PIs) from the collected sensor data. The term "sensor data" is herein to be interpreted broadly, and may comprise raw sensor data and/or processed sensor data (e.g. object-level data) obtained from a perception system of the ADS (i.e. perception data). Thus, sensor data may be construed as data originating from one or more on board sensors of the vehicle. The methodology for deriving or calculating the PI-values are considered to be readily known by the person skilled in the art, and will for the sake of brevity and conciseness not be discussed in any lengthy detail. However, to give some example definitions of some of the aforementioned PI-types, BTN and STN may be defined as the ratio of the needed acceleration and maximum achievable acceleration for braking and steering actions, respectively. Thus, for a BTN<1 or a STN<1, a potential collision can be avoided by braking or steering away from the object, respectively. TTC refers to the time remaining before a collision if the course and speed (or acceleration) of the vehicle (and potentially of the other object) remains the same. PET may be defined as the time between the moment that a first road-user leaves the path of a second road-user (area of encroachment) and the moment that the second road-user reaches the same area. The PET value accordingly indicates the extent to which the two road-users missed each other.

Moreover, the PI-values may be continuously derived S202 by the vehicle (or a processing circuitry thereof) throughout a driving session, or at a suitable frequency based on the collected sensor data. Alternatively, the vehicles may at least temporarily store all of the sensor data generated throughout a driving session, and to subsequently derive S202 the PI-values for that driving session when the vehicle is stationary (e.g. parked) or in any other situation indicating a reduced need for processing power for the vehicle's operational capability. In some embodiments, one or more PI-values is derived at certain scenes or scenarios that the vehicle is exposed to (e.g. when passing an obstacle or other object).

Once the PI values have been derived S202 they may be transmitted S203 from the ADS-equipped vehicles to a remote data repository (e.g. the "back-office" mentioned in the foregoing) at a suitable moment in time (e.g. in dependence of connectivity, available power, etc.). Here, several alternatives of how much of, or in what form, the derived S202 data is transmitted 203 may be applied. In some embodiments, only PI-values above a threshold are transmitted, i.e. the ADS-equipped vehicles are configured to do some filtering prior to the transmission S203. Stated differently, the ADS-equipped vehicles may apply a Peak over Threshold (POT) approach prior to transmitting the PI values. However, in some embodiments, the ADS-vehicles may apply a Block Maxima approach for the pre-transmission filtering, meaning that the highest PI value of a time period (e.g. a day, a week, a month), a driving session (regardless of the length of the driving session), or after a defined driving distance (e.g. every 10 km, every 100 km, every 200 km, etc.) is transmitted. This pre-transmission filtering process in the ADS-equipped vehicles may be useful to avoid transmitting data that is of minor relevance for the subsequent EVT-modelling, or to avoid transmitting unnecessarily large amounts of data.

Moreover, the ADS-equipped vehicles may also be configured to continuously/periodically report a distance driven of the ADS-equipped vehicle or a number of operating hours of the ADS together with the PI-value transmission S203. Thus, in some embodiments, the step of obtaining S102 the plurality of PIs further comprises obtaining data indicative of a distance driven and/or a number of operating hours of each ADS-equipped vehicle that provided the PIs. Moreover, in some embodiments, some ADS-equipped vehicles may not report any PIs but still report a distance driven and/or a number of operating hours (e.g. since the last report). This may for example be the case when some of the ADS-equipped vehicles have operated without experiencing any exceedances of PIs (e.g. when using the POT-approach for deciding which PI values to transmit/report).

Moving on, the method S100 further comprises modelling S103 at least a subset of the obtained PIs of each PI-type based on an EVT model. Each modelled PI-type will accordingly be indicative of a probability for exceeding a PI-value for that PI-type. In some embodiments, the modelling S103 comprises fitting the EVT model to at least a subset of the obtained plurality of PIs of that PI-type in order to form a function indicative of the probability of exceeding a PI-value for that PI-type. Moreover, the formed function may further include a confidence interval of the EVT model. In other words, each EVT model may comprise a confidence interval around the most likely EVT model for a PI-type.

Furthermore, in some embodiments, the method S100 further comprises selecting a subset of the obtained plurality of PIs for each PI-type that are in violation of a PI-value threshold for an associated PI-type. The EVT model is accordingly fitted to the selected subset of PIs for each PI-type. This may be understood as the aforementioned Peak over Threshold (POT) approach.

Similarly, in some embodiments, the method S100 further comprises forming a subset of the obtained plurality of PIs for each PI-type by selecting a maximum (or minimum) PI-value within each of a plurality of defined sub-periods of the one or more driving sessions of the ADS-equipped vehicles for an associated PI-type. The EVT model is accordingly fitted to the formed subset of PIs for each PI-type. This may be understood as the aforementioned Block Maxima approach. It should be noted that the term "sub-period" does not necessarily need to be in reference to a time period, but may also be a specific distance driven as already exemplified.

Furthermore, this block maxima approach is not limited to selecting maximum values, but also be in the form of selecting a minimum value (depending on which is the "extreme" measure). For example, for TTC a lower value (i.e. close to zero) is more "extreme" than a high TTC value. However, one may also invert the TTC value and use $-TTC$ instead, thereby the "maximum" TTC value will be the most "extreme", i.e. $\max(-TTC)$ can be used. Similar reasoning may be applied for other PI-types such as Time to Brake (TTB). As readily understood by the skilled reader, the inverting of a PI-type may also be applicable when using the aforementioned POT approach.

The method S100 further comprises evaluating S104 each modelled PI-type against a corresponding predefined requirement. In some embodiments, the predefined requirement comprises an exceedance threshold for a defined frequency of exceedance. Accordingly, the evaluation S104 of the modelled PIs may comprise determining that a modelled PI-type fails the predefined requirement if the function violates the exceedance threshold for the defined frequency of occurrence.

Furthermore, the method S100 comprises determining S105 that the ADS has violated one or more safety or quality requirements if the evaluation S104 is indicative of one or more modelled PI-types failing the corresponding predefined requirements.

Figure 3:
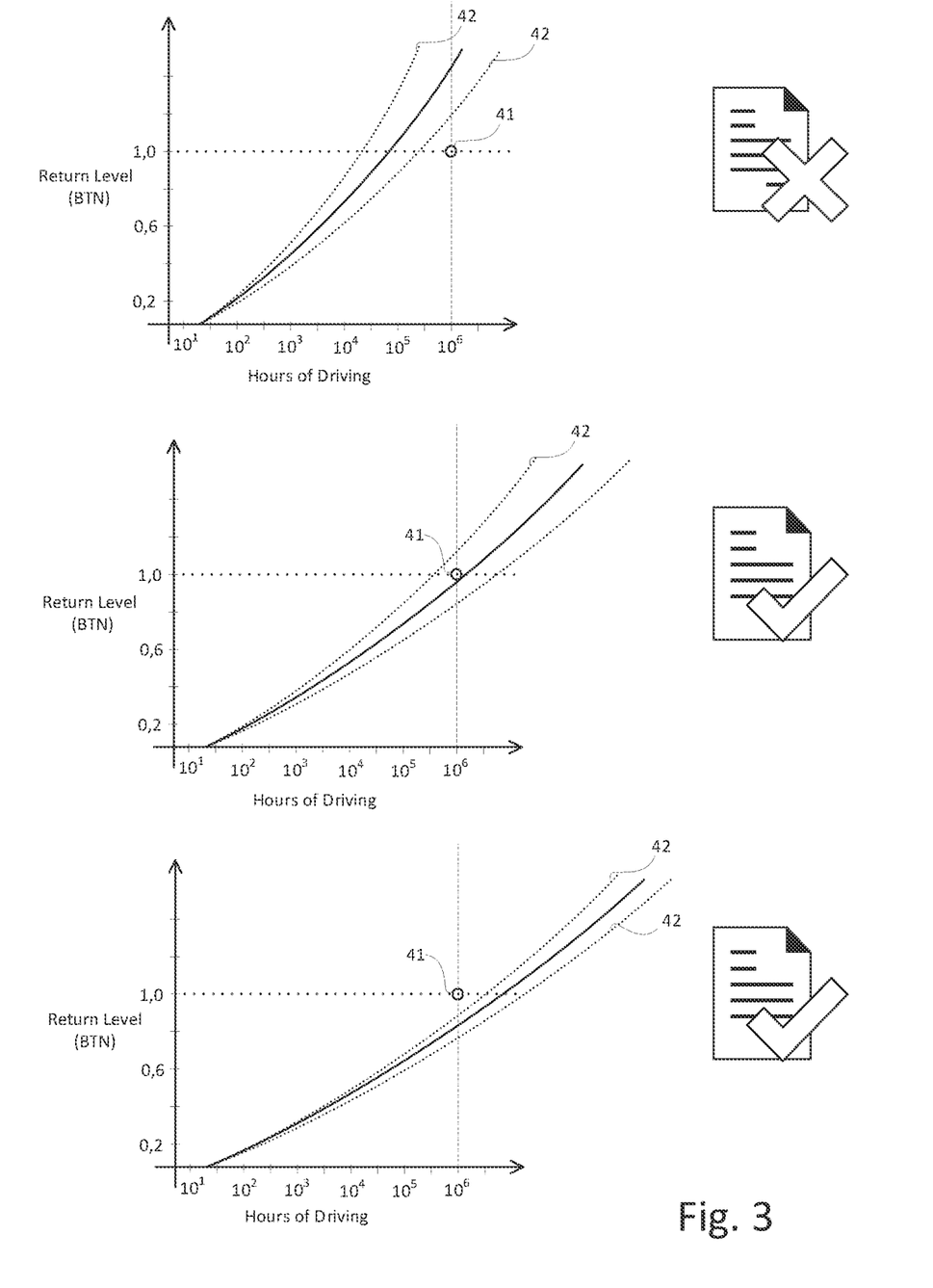
FIG. 3 is a schematic illustration of a modelled PI-type in accordance with some embodiments.

Turning briefly to FIG. 3 which shows three example plots/graphs of an EVT-modelled PI-type, herein the form of Brake Threat Number (BTN) in accordance with some embodiments. In more detail, FIG. 3 serves to show three figurative examples of how the PIs may be modelled using EVT, and how a predefined requirement may take form in accordance with some embodiments.

In more detail, each of the graphs show a return level (BTN) over a return period (here in the form of driving hours, but may alternatively be expressed as a distance driven). The graphs indicate a probability for exceeding a BTN value for a given amount of driving hours, i.e. a frequency of exceedance of the BTN. In the illustrated graphs, the predefined requirement is that the ADS shouldn't exceed a BTN value of 1 per $10^6$ hours of driving. In other words, the predefined requirement stipulates that the ADS shouldn't experience a situation where the BTN value reaches 1 more than once per $10^6$ hours of driving. In the depicted example, this means that the fitted model (indicated by the solid line) including the confidence interval (indicated by the area between the broken lines 42) should not only consist of values of the return level ≥1 for any return period lower than $10^6$ hours of driving. In other words, if the area between the broken lines 42 is to the left of the exceedance threshold 41 along the horizontal broken line intersecting BTN=1, then the predefined requirement is violated.

Accordingly, the top-most example violates the predefined requirement as the confidence interval for the exceedance threshold (BTN=1) is clearly below the defined frequency of occurrence (Hours of Driving=$10^6$ hours). On the other hand, the middle example does not violate the predefined requirement as the exceedance threshold for the defined frequency of occurrence is within the confidence interval. In more detail, assuming that we have a formulated null-hypothesis stating that the ADS is performing in compliance the predefined safety and/or quality requirements (which is plausible to assume since the ADS is used in traffic), then one cannot reject the null-hypothesis as the exceedance threshold for the defined frequency of occurrence is within the confidence interval. In other words, in order to reject the null-hypothesis, and consequently to "discredit" the ADS with a certain confidence (e.g. 95%), the EVT model must exhibit a situation similar to the top-most example. Analogously for the top-most example, the null-hypothesis can be rejected since one can say that the modelled BTN shows that the ADS is not fulfilling the predefined requirement with a certain confidence (defined by the selected confidence interval). The bottom example shows another situation where the modelled PI-type upholds (or is in compliance with) the predefined requirement.

Figure 2:
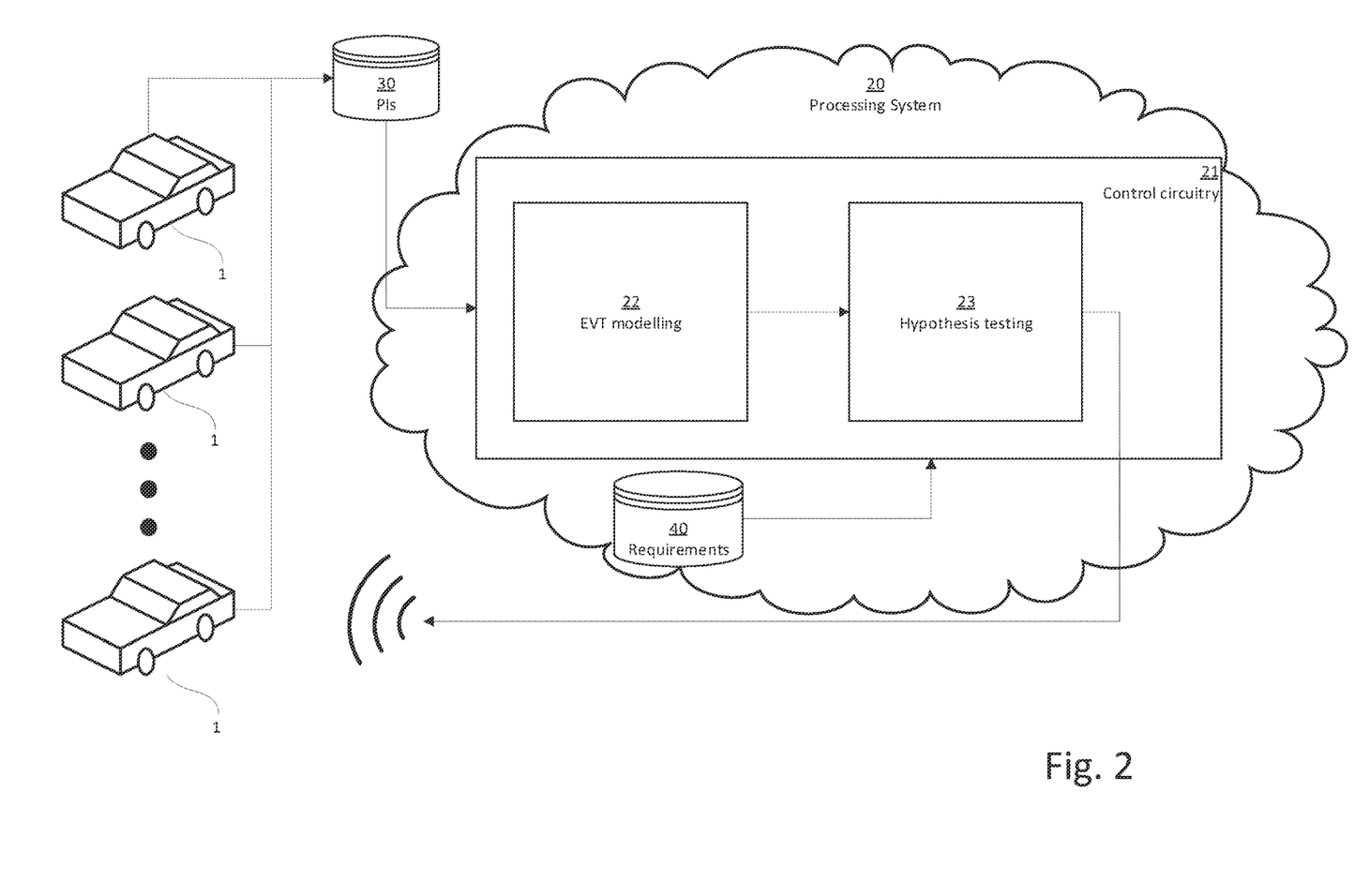
FIG. 2 is a schematic block diagram representation of a processing system for safety and/or performance monitoring of an Automated Driving System (ADS) in accordance with some embodiments.

It should be noted that the middle-example depicted in FIG. 2 may, in some embodiments, result in a rejection of the null-hypothesis (i.e. a violation of the predefined requirements) depending on how the null-hypothesis is formulated, and how conservative evaluation one would want to realize. In the illustrated example, the purpose is to indicate that the system is not performing in compliance with safety/quality requirements with a certain confidence level. In other words, the null-hypothesis in the illustrated examples is that "the ADS is compliant", and the purpose of the hypothesis testing is to be able to say, with a certain confidence, that the ADS is not compliant. However, as readily understood by the person skilled in the art, one may apply a more conservative approach and therefore would want to indicate that the system is performing in compliance with safety/quality requirements. In other words, the null-hypothesis would then be that the "ADS is not compliant", and the purposes of the hypothesis testing would be to be able to say, with a certain confidence, that the ADS is compliant. In such embodiments, only the bottom-most model would then indicate compliance with the predefined requirements, where the null hypothesis can be rejected with a certain confidence (e.g. 95%).

Reverting back to FIG. 1, and when it has been determined S104 that the ADS has violated one or more safety or quality requirements, the method S100 further comprises transmitting S106 a first signal indicative of the violated one or more safety or quality requirements to an ADS management system and/or a second signal to the plurality of ADS-equipped vehicles. The "ADS management system" may be construed as a system or entity responsible for the control of the ADS functionality across an entire fleet of ADS-equipped vehicle, and may for example be capable of updating the ADS software across the fleet, or to instruct the vehicles of the fleet to inhibit activation of the ADS until further notice.

Accordingly, in some embodiments, the transmitted S106 first signal is further indicative of an instruction to perform a central software roll-back of the ADS, to perform a central software update of the ADS, or to perform a central inhibition of further activation of a current software version of the ADS.

Similarly, the second signal (i.e. the signal that is transmitted to the ADS-equipped vehicles) may be further indicative of an instruction to perform a local software roll-back of the ADS, to perform a local software update of the ADS, or to inhibit further activation of a current software version of the ADS.

In other words, the processing system performing the method S100 may be in the form of an independent "ADS monitoring system", and upon detection of a violation of one or more safety and/or quality requirements, it may be configured to transmit a signal to a central entity responsible for managing the ADS functionality of the associated fleet. However, in some embodiments, the processing system performing the method S100 forms a part of the central entity managing the ADS functionality of the associated fleet, and in that case may be configured to directly communicate with the associated fleet.

Executable instructions for performing these functions are, optionally, included in a non-transitory computer-readable storage medium or other computer program product configured for execution by one or more processors.

FIG. 2 is a schematic block diagram representation of a processing system 20 for safety and/or performance monitoring of an Automated Driving System (ADS) deployed in a fleet of vehicles. In general, FIG. 2 depicts the flow of information from the vehicles 1 generating the performance indicators 30 to the EVT modelling 22 and subsequent evaluation (e.g. hypothesis testing 23) in the "back-office" 20. Accordingly, the system 20 comprises control circuitry 21 configured to perform the functions of the methods disclosed herein, where the functions may be included in a non-transitory computer-readable storage medium or other computer program product configured for execution by the control circuitry. However, in order to better elucidate the present invention, the control circuitry 21 is provided with "modules" 22, 23 in FIG. 2, each of them linked to one or more specific functions. The processing system may be comprised by a remote server, or realized as a distributed system (a so-called cloud computing system) comprising a plurality of such remote servers.

The processing system 20 comprises control circuitry 21 configured to obtain a plurality of Performance Indicators (PIs) generated by each of a plurality of ADS-equipped vehicles 1 based one or more driving sessions. The obtained plurality of PIs are of at least one PI-type and each PI-type is indicative of a safety-critical or quality-critical incident that the ADS-equipped vehicles have been exposed to during the one or more driving sessions.

The control circuitry 21 is further configured to model each PI-type of the obtained PIs based on an Extreme Value Theory (EVT) model, where each modelled PI-type is indicative of a probability for exceeding a PI-value for that PI-type. In particular, the control circuitry 21 may be configured to model each PI-type by fitting the EVT model to at least a subset of the obtained plurality of PIs of that PI-type in order to form a function indicative of the probability of exceeding a PI-value for that PI-type. Moreover, the control circuitry 21 may be further configured to include EVT models comprising confidence intervals around the most likely EVT model for a PI-type." The confidence interval is derived from the EVT model as readily understood by the person skilled in the art.

Further, the control circuitry 21 is configured to evaluate each modelled PI-type against a corresponding predefined requirement, which may be retrieved from a suitable data repository 40. This evaluation is indicated in FIG. 2 as hypothesis testing 23, referring to the aforementioned null-hypothesis.

If the evaluation is indicative of one or more modelled PI-types failing the corresponding predefined requirements, the control circuitry is further configured to determine that the ADS has violated one or more safety or quality requirements, and to transmit a first signal indicative of the violated one or more safety or quality requirements to an ADS management system and/or a second signal to the plurality of ADS-equipped vehicles.

Figure 4:
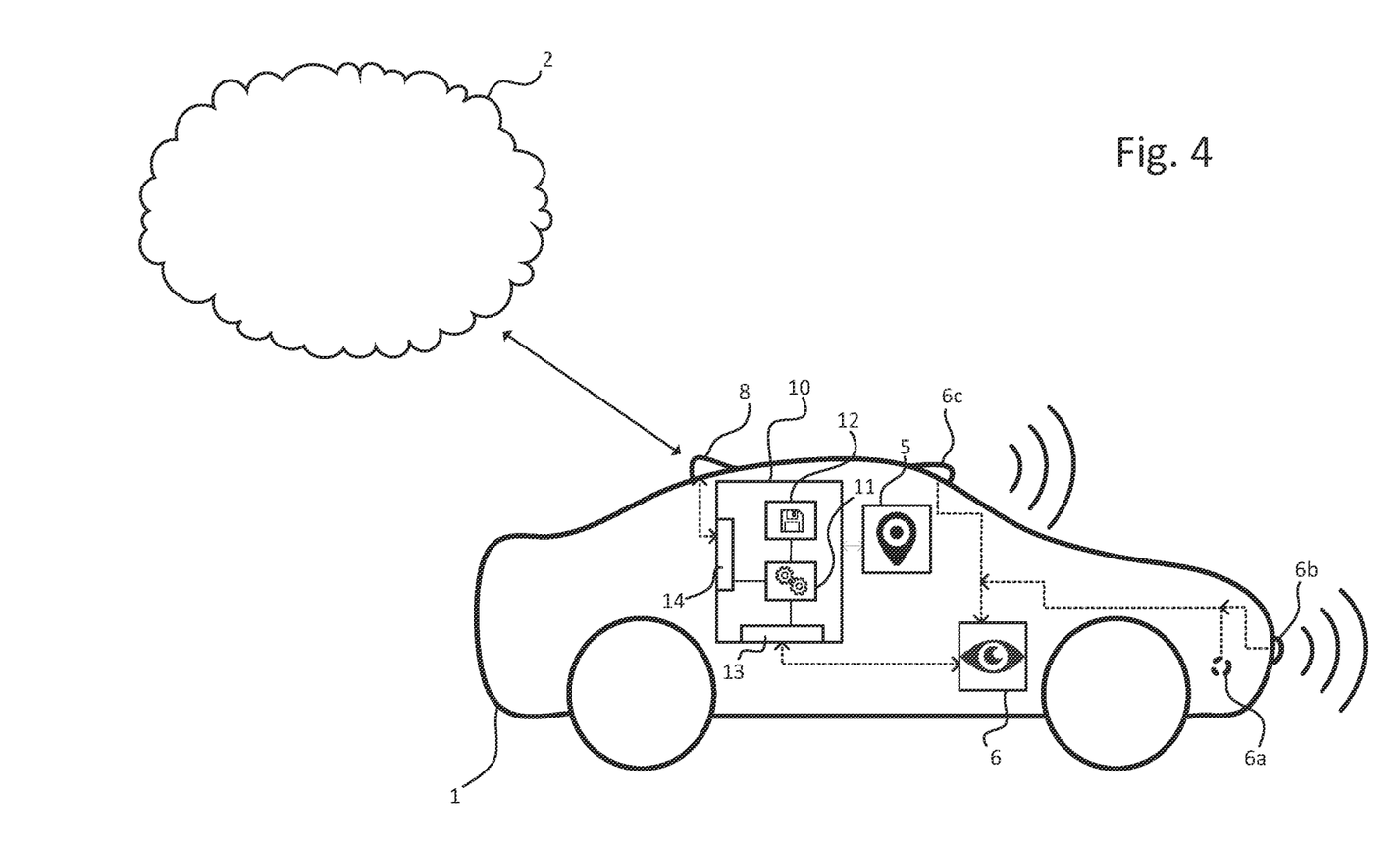
FIG. 4 is a schematic side-view illustration of an ADS-equipped vehicle in accordance with some embodiments.

FIG. 4 is a schematic side-view of an ADS-equipped vehicle 1 in accordance with some embodiments. The vehicle 1 accordingly comprises an Automated Driving System 10 comprising one or more processors 11, a memory 12, a sensor interface 13 and a communication interface 14. The processor(s) 11 may also be referred to as a control circuit 11 or control circuitry 11. The control circuitry 11 is configured to execute instructions stored in the memory 12 to perform a method for deriving and transmitting PI-values in accordance with the teachings herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described in the foregoing with reference to FIG. 1, and in particular the steps performed in the vehicle. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

The vehicle 1 further comprises a perception system 6 or perception block 6, and a localization system 5. A perception system 6 is in the present context to be understood as a system responsible for acquiring raw sensor data from on-board sensors 6a, 6b, 6c such as cameras, LIDARs and RADARs, ultrasonic sensors, and converting this raw data into scene understanding. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy.

In more detail, the perception system/block 6 may refer to any commonly known system and/or functionality, e.g. comprised in one or more electronic control modules and/or nodes of the vehicle 1, adapted and/or configured to interpret sensory information—relevant for driving of the vehicle 1—to identify e.g. obstacles, vehicle lanes, relevant signage, appropriate navigation paths etc. The exemplified perception system 6 may thus be adapted to rely on and obtain inputs from multiple data sources, such as automotive imaging, image processing, computer vision, and/or in-car networking, etc., in combination with sensory information. Such exemplifying sensory information may for instance be derived from one or more optional surrounding detecting sensors 6a-c comprised in and/or provided on-board the vehicle 1. The surrounding detecting sensors 6a-c may be represented by any arbitrary sensors adapted to sense and/or perceive the vehicle's 1 surroundings and/or whereabouts, and may e.g. refer to one or a combination of one or more of radar, LIDAR, sonar, camera, navigation system e.g. GPS, odometer and/or inertial measurement units.

Further, the vehicle 1 may be connected to external network(s) 20 via for instance a wireless link (e.g. for transmitting PI-values). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 21 (associated with the processing system 20) may be or include any number of hardware components for conducting data or signal processing or for executing computer code stored in memory. In more detail, the processing system 20 may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor 21 (e.g., via a circuit or any other wired, wireless, or network connection) and includes computer code for executing one or more processes described herein.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the invention. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:

1. A method performed by a processing system for safety and/or performance monitoring of an Automated Driving System (ADS), the method comprising:
    obtaining, by a control circuitry of the processing system, a plurality of Performance Indicators (PIs) generated by each of a plurality of ADS-equipped vehicles based on one or more driving sessions, wherein the plurality of PIs are of at least one PI-type and wherein each PI-type is indicative of a safety-critical or quality-critical incident that the ADS-equipped vehicles have been exposed to during the one or more driving sessions;
    modelling, by the control circuitry of the processing system, each PI-type of the obtained PIs based on an Extreme Value Theory (EVT) model, wherein each modelled PI-type is indicative of a probability for exceeding a PI-value for that PI-type;
    evaluating, by the control circuitry of the processing system, each modelled PI-type against a corresponding predefined requirement; and
    if the evaluation is indicative of one or more modelled PI-types failing the corresponding predefined requirements:
        determining, by the control circuitry of the processing system, that the ADS has violated one or more safety or quality requirements, and
        transmitting, by the control circuitry of the processing system, a first signal indicative of the violated one or more safety or quality requirements to an ADS management system and/or a second signal to the plurality of ADS-equipped vehicles, wherein residual risks in the plurality of ADS-equipped vehicles are reduced.

2. The method according to claim 1, wherein the transmitted first signal to the ADS management system is further indicative of an instruction to:
    perform a central software roll-back of the ADS,
    perform a central software update of the ADS, or
    perform a central inhibition of further activation of a current software version of the ADS.

3. The method according to claim 1, wherein the second signal transmitted to the plurality of ADS-equipped vehicles is indicative of an instruction to:
    perform a local software roll-back of the ADS,
    perform a local software update of the ADS, or
    inhibit further activation of a current software version of the ADS.

4. The method according to claim 1, wherein the modelling of each PI-type comprises:
    fitting the EVT model to at least a subset of the obtained plurality of PIs of that PI-type in order to form a function indicative of the probability of exceeding a PI-value for that PI-type.

5. The method according to claim 4, further comprising:
    selecting a subset of the obtained plurality of PIs for each PI-type that are in violation of a PI-value threshold for an associated PI-type; and
    wherein the EVT model is fitted to the selected subset of PIs for each PI-type.

6. The method according to claim 4, further comprising:
    forming a subset of the obtained plurality of PIs for each PI-type by selecting a maximum PI-value within each of a plurality of defined sub-periods of the one or more driving sessions of the ADS-equipped vehicles for an associated PI-type; and
    wherein the EVT model is fitted to the formed subset of PIs for each PI-type.

7. The method according to claim 1, wherein the predefined requirement comprises an exceedance threshold for a defined frequency of exceedance, wherein the evaluation of the modelled PIs comprises:
    determining that a modelled PI-type fails the predefined requirement if the function violates the exceedance threshold for the defined frequency of occurrence.

8. The method according to claim 1, wherein the at least one PI-type is at least one of:

a Brake Threat Number (BTN);
a Steering Threat Number (STN);
a Time to Brake (TTB);
a distance to a road reference;
a distance to an external object;
a Time To Collision (TTC); and
a Post Encroachment Time (PET).

9. The method according to claim 1, wherein each modelled PI-type comprises:
   a function of a PI-value over operating hours for that PI-type; or
   a function of a PI-value over a distance driven for that PI-type.

10. A non-transitory computer-readable storage medium storing one or more programs configured to be executed by one or more processors of a processing system, the one or more programs comprising instructions for performing the method according to claim 1.

11. A processing system for safety and/or performance monitoring of an Automated Driving System (ADS), the processing system comprising control circuitry configured to:
   obtain a plurality of Performance Indicators (PIs) generated by each of a plurality of ADS-equipped vehicles based one or more driving sessions, wherein the plurality of PIs are of at least one PI-type and wherein each PI-type is indicative of a safety-critical or quality-critical incident that the ADS-equipped vehicles have been exposed to during the one or more driving sessions;
   model each PI-type of the obtained PIs based on an Extreme Value Theory (EVT) model, wherein each modelled PI-type is indicative of a probability for exceeding a PI-value for that PI-type;
   evaluate each modelled PI-type against a corresponding predefined requirement; and
   if the evaluation is indicative of one or more modelled PI-types failing the corresponding predefined requirements, the control circuitry is further configured to:
      determine that the ADS has violated one or more safety or quality requirements if the evaluation is indicative of one or more modelled PI-types failing the corresponding predefined requirements, and
      transmit a first signal indicative of the violated one or more safety or quality requirements to an ADS management system and/or a second signal to the plurality of ADS-equipped vehicles, wherein residual risks in the plurality of ADS-equipped vehicles are reduced.

12. The processing system according to claim 11, wherein the control circuitry is configured to model each PI-type by:
   fitting the EVT model to at least a subset of the obtained plurality of PIs of that PI-type in order to form a function indicative of the probability of exceeding a PI-value for that PI-type, wherein the formed function includes a confidence interval of the EVT model.

13. The processing system according to claim 11, wherein the predefined requirement comprises an exceedance threshold for a defined frequency of exceedance, and wherein the control circuitry is further configured to:
   determine that a modelled PI-type fails the predefined requirement if the function violates the exceedance threshold for the defined frequency of occurrence.

14. A remote server comprising the processing system according to claim 11.

15. A cloud environment comprising one or more remote servers according to claim 14.

* * * * *